(12) United States Patent
Hayashi et al.

(10) Patent No.: US 9,448,089 B2
(45) Date of Patent: Sep. 20, 2016

(54) OPTICAL ENCODER

(71) Applicant: Okuma Corporation, Niwa-gun, Aichi (JP)

(72) Inventors: Yasukazu Hayashi, Aichi (JP); Atsushi Ieki, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 103 days.

(21) Appl. No.: 14/523,005

(22) Filed: Oct. 24, 2014

(65) Prior Publication Data

US 2015/0115141 A1  Apr. 30, 2015

(30) Foreign Application Priority Data

Oct. 30, 2013 (JP) .................. 2013-225865

(51) Int. Cl.
*G01D 5/347* (2006.01)
*G01D 5/244* (2006.01)

(52) U.S. Cl.
CPC .......... *G01D 5/347* (2013.01); *G01D 5/24428* (2013.01); *G01D 5/34715* (2013.01)

(58) Field of Classification Search
CPC ............. G01D 5/247; G01D 5/24715; G01D 5/34707; G01D 5/24428
See application file for complete search history.

(56) References Cited

U.S. PATENT DOCUMENTS

| | | | | |
|---|---|---|---|---|
| 4,782,229 A | * | 11/1988 | Ernst ...................... | G01D 5/366 250/208.6 |
| 4,979,827 A | * | 12/1990 | Matsui ..................... | G01D 5/38 250/237 G |
| 5,604,345 A | * | 2/1997 | Matsuura ............... | G01D 5/366 250/231.16 |
| 5,748,373 A | * | 5/1998 | Hane ....................... | G01D 5/366 250/237 G |
| 5,750,984 A | * | 5/1998 | Ieki .......................... | G01D 5/36 250/231.16 |
| 5,801,378 A | * | 9/1998 | Hane ....................... | G01D 5/38 250/231.14 |
| 5,874,729 A | * | 2/1999 | Holzapfel .............. | G01D 5/366 250/231.16 |
| 5,981,942 A | * | 11/1999 | Ieki .......................... | G01D 5/36 250/231.16 |
| 6,094,307 A | * | 7/2000 | Ieki ..................... | G01D 5/34792 250/237 G |
| 6,956,200 B2 | * | 10/2005 | Ohmura ................. | G01D 5/347 250/214.1 |
| 7,268,883 B2 | * | 9/2007 | Holzapfel .......... | G01D 5/34715 356/450 |
| 7,301,142 B2 | * | 11/2007 | Shichi ...................... | G01D 5/36 250/231.13 |
| 7,324,212 B2 | * | 1/2008 | Mitchell .................. | G01D 5/38 250/237 G |
| 7,679,533 B2 | * | 3/2010 | Franklin .................. | G01D 5/36 250/231.13 |
| 8,735,801 B2 | * | 5/2014 | Nagura .............. | G01D 5/34784 250/231.13 |

(Continued)

FOREIGN PATENT DOCUMENTS

JP  10-132614 A  5/1998

*Primary Examiner* — John Lee
(74) *Attorney, Agent, or Firm* — McCarter & English, LLC

(57) ABSTRACT

An optical encoder, comprising a plurality of light receiving elements 1-12, receiving light that has passed through or been reflected by a scale having a lattice of pitch P, and outputting four-phase signals that have been respectively offset in phase by an integer number of times 90° (1/4P). 12 light receiving elements being are in the lateral direction (scale longitudinal direction) with gaps between them of P/60 or 2P/60, four arbitrary light receiving elements arranged next to each other in a row all output signals of different phases, and light receiving elements respectively outputting signals of same phase have three lateral widths of 7OP/60, 13P/60 or 20P/60.

2 Claims, 3 Drawing Sheets

(56) References Cited

U.S. PATENT DOCUMENTS

| | | | | |
|---|---|---|---|---|
| 8,742,322 B2* | 6/2014 | Ishizuka | | G01D 5/34707 250/231.16 |
| 9,024,251 B2* | 5/2015 | Nagura | | G01D 5/34707 250/231.11 |
| 2002/0008195 A1* | 1/2002 | Aoki | | G01D 5/34715 250/231.14 |
| 2003/0047673 A1* | 3/2003 | Thorburn | | G01D 5/366 250/231.13 |
| 2004/0046113 A1* | 3/2004 | Mayer | | G01D 5/366 250/231.13 |
| 2004/0183000 A1* | 9/2004 | Ohmura | | G01D 5/347 250/231.13 |
| 2004/0218190 A1* | 11/2004 | Holzapfel | | G01D 5/34715 356/498 |
| 2007/0138382 A1* | 6/2007 | Matsuyama | | G01D 5/2451 250/231.13 |
| 2010/0244815 A1* | 9/2010 | Burkhardt | | G01D 5/2457 324/207.11 |
| 2011/0024652 A1* | 2/2011 | Shoji | | G01D 5/34707 250/557 |
| 2012/0261562 A1* | 10/2012 | Nagura | | G01D 5/34707 250/231.1 |
| 2012/0265484 A1* | 10/2012 | Nagura | | G01D 5/34746 702/150 |
| 2013/0271773 A1* | 10/2013 | Shirai | | G01B 9/02083 356/499 |
| 2015/0115141 A1* | 4/2015 | Hayashi | | G01D 5/347 250/231.1 |

* cited by examiner

OPTICAL ENCODER

CROSS-REFERENCE TO RELATED APPLICATIONS

This application claims priority under 35 U.S.C. §119(a)-(d) to Japanese Patent Application No. 2013-225865, filed Oct. 30, 2013, which is incorporated herein by reference in its entirety.

FIELD OF THE INVENTION

The present invention relates to an optical encoder that is incorporated into a machine tool, semiconductor manufacturing device etc., for detecting position of a movable axis.

BACKGROUND OF THE INVENTION

JP 10-132614 A describes an optical encoder that can obtain a displacement signal without causing a position detection error and with little distortion, even if tarnishing or scratching of a scale occurs, by arranging light receiving elements if a plurality of different groups for every phase.

If it is possible to make the light receiving region of the light receiving elements narrow, it is easy to simplify a light source, making it possible to reduce the cost of the optical encoder. With an arrangement method for light receiving elements disclosed in an embodiment of the optical encoder disclosed in JP 10-132614 A, a gap between light receiving elements is still wide. As a result, there has been a need for an optical encoder that can obtain a displacement signal with which no position detection error occurs and with little distortion, even if tarnishing or scratching of the scale occurs, particularly one operating with a much narrower gap between light receiving elements. Also, the wider the gap between light receiving elements the more ineffective light increased, and wasted power consumed by the light source increased in proportion to this ineffective light. As a result, there has also been a need for an encoder with narrow gaps between light receiving elements from the viewpoint of energy conservation.

The present invention has been conceived in view of the above-described situation, and an object of the present invention is to provide a high precision optical encoder by devising an arrangement method for optical elements that can obtain a displacement signal with which no position detection error occurs and that has little distortion, even if a scale becomes tarnished or scratched, and by enabling operation with narrow light receiving regions, to thereby realize cost reduction and reduced power consumption by simplifying a light source.

SUMMARY OF THE INVENTION

An optical encoder of the present invention comprises a plurality of light receiving elements, receiving light that has passed through or been reflected from a scale having a lattice of pitch P, and outputting four phase signals that have been respectively offset in phase by an integer multiple of 90° (1/4P), all of the light receiving elements having the same longitudinal width, with 12N (N is a natural number) light receiving elements being arranged in the lateral direction (scale longitudinal direction) with gaps between them of P/60 or 2P/60, four arbitrary light receiving elements arranged next to each other in a row all outputting signals of different phases, and light receiving elements respectively outputting signals of same phase having three lateral widths of 7P/60, 13P/60 or 20P/60.

Also, with the optical encoder of the present invention, the light receiving elements are preferably formed as parallelograms with upper and lower edges being offset in the lateral direction by P/7.

With the present invention, an optical encoder adopting the technology of JP 10-132614 A capable of obtaining a displacement signal with which there is no position detection error and only slight distortion, even if the scale is tarnished or scratched, can be realized with narrow gaps of P/60 or 2P/60 arranged between light receiving elements, and the light receiving area having a minimum width of less than 3P, namely 168P/60. In this way it is possible to realize a high precision optical encoder of low-cost and low-power consumption.

BRIEF DESCRIPTION OF THE DRAWINGS

A preferred embodiment of the present invention will be described in detail by reference to the following figures, wherein.

DETAILED DESCRIPTION OF EMBODIMENTS OF THE INVENTION

Figure 1:
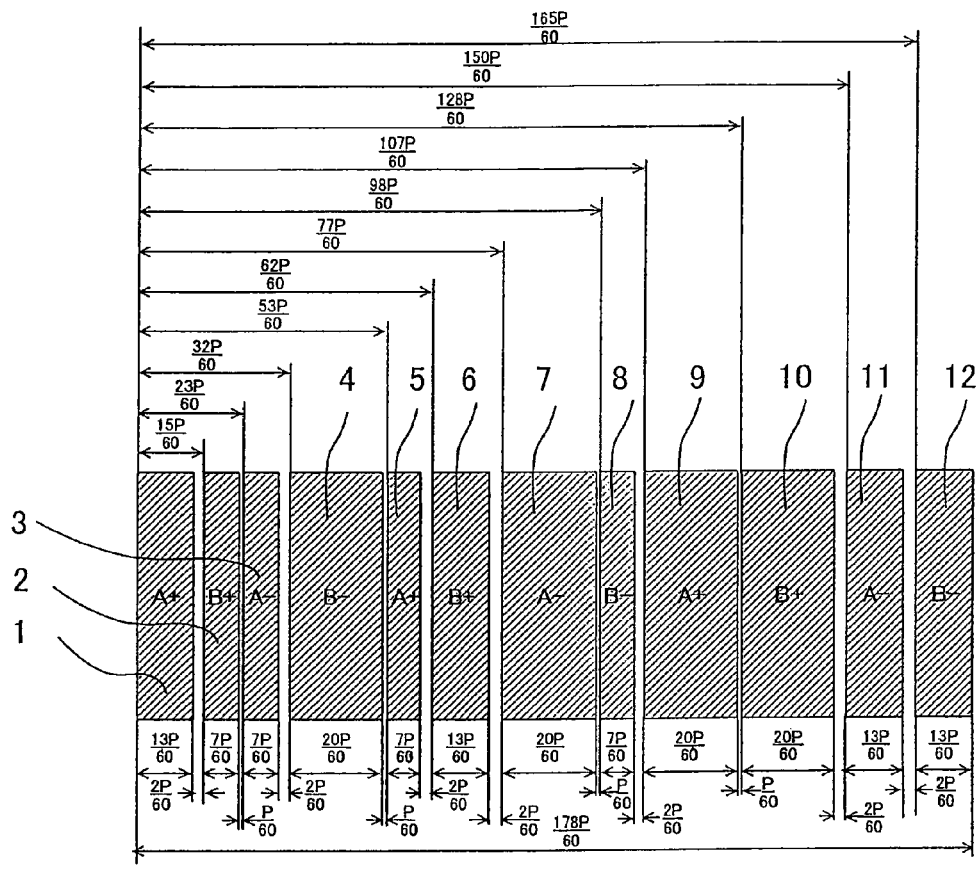
FIG. 1 is a drawing showing the arrangement of light receiving elements of an optical encoder of the present invention.

Light receiving elements 1, 2, 3, 4, 5, 6, 7, 8, 9, 10, 11 and 12 in FIG. 1 all have the same longitudinal width (length in the short direction of the scale), and are arranged in the longitudinal direction of the scale with gaps of P/60 or 2P/60 between each light receiving element. Also, connection states of the light receiving elements are not shown in the drawings, but the light receiving elements 1, 2, 3, 4, 5, 6, 7, 8, 9, 10, 11 and 12 are connected at their rear surfaces to a common electrode. Also, light receiving elements 1, 5 and 9 have transparent electrodes on the front surface connected in parallel, and output signal A+. Also, light receiving elements 2, 6 and 10 have transparent electrodes on the front surface connected in parallel, and output signal B+ which differs in phase from signal A+ by 90° (P/4). Also, light receiving elements 3, 7 and 11 have transparent electrodes on the front surface connected in parallel, and output signal A− which differs in phase from signal A+ by 180° (2P/4). Also, light receiving elements 4, 8 and 12 have transparent electrodes on the front surface connected in parallel, and output signal B− which differs in phase from signal A+ by 270° (3P/4). With the above structure, an arbitrary four light receiving elements that are side-by-side are arranged so as to all output signals of different phases. Also, light receiving elements 2, 3, 5 and 8 have a lateral width of 7P/60. Also, light receiving elements 1, 6, 11 and 12 have a lateral width of 13P/60. Light receiving elements 4, 7, 9 and 10 have a lateral width of 20P/60 (P/3).

Specifically, light receiving elements that output signals of the same phase (for example light receiving elements 1, 5 and 9 for outputting signal A+, and light receiving elements 2, 6 and 10 for outputting signal B+) have three lateral widths of 7P/60, 13P/60 and 20P/60. Also, two sets of light receiving elements that are 180° different (light receiving elements for A+ and light receiving elements for A−, or light receiving elements for B+ and light receiving elements for B−) have a sequence of lateral widths of light receiving elements that different, but the alignment sequence is the same. For example, lateral widths of the three light receiving elements for A+ are in the order, from the left side, 13P/60, 7P/60 20P/60, while the lateral widths of the light receiving elements for A− are in the order, from the left side, 7P/60, 20P/20, 13P/60. Specifically, light receiving elements for A+ and light receiving elements for A− both have a light receiving element of lateral width 7P/60 positioned after a light receiving element of lateral width 13P/60 (in the event that a light receiving element of lateral width 13P/60 is at the tail, positioned at the head), and a light receiving element of lateral width 20P/60 positioned after a light receiving element of lateral width 7P/60. Similarly, light receiving elements for B+ and light receiving elements for B− both have a light receiving element of lateral width 13P/60 positioned after a light receiving element of lateral width 7P/60, and a light receiving element of lateral width 20P/60 positioned after a light receiving element of lateral width 13P/60 (in the event that a light receiving element of lateral width 13P/60 is at the tail, positioned at the head).

Figure 2:
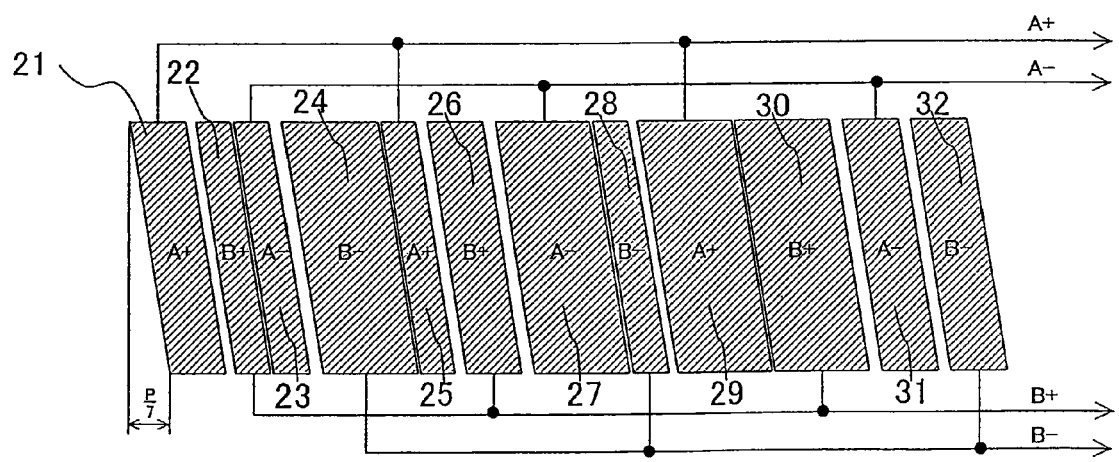
FIG. 2 is a drawing showing the arrangement of light receiving elements of another optical encoder of the present invention.
Figure 3:
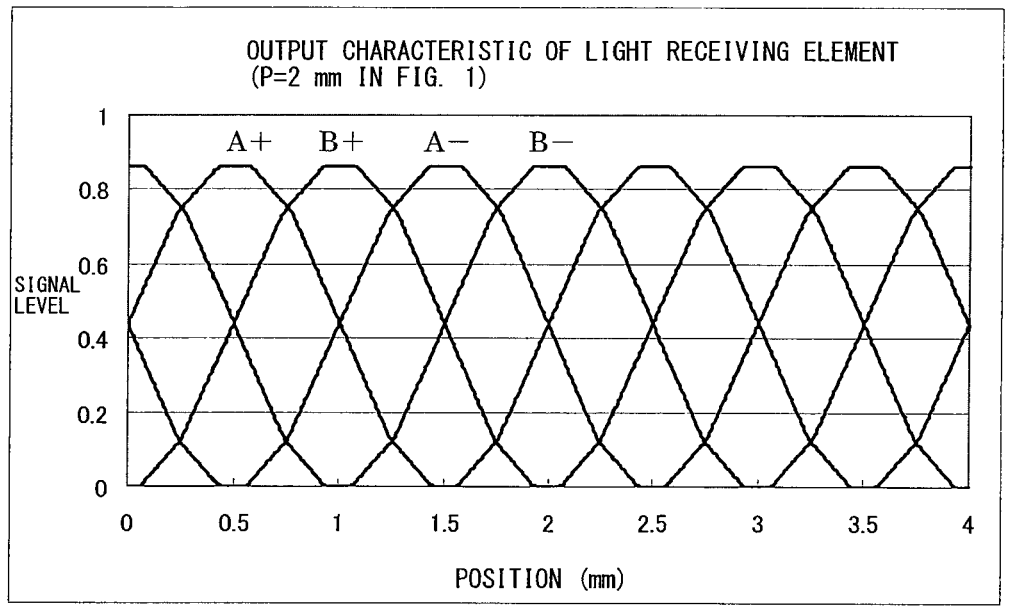
FIG. 3 is a graph showing output signals of the optical encoder of FIG. 1.
Figure 4:
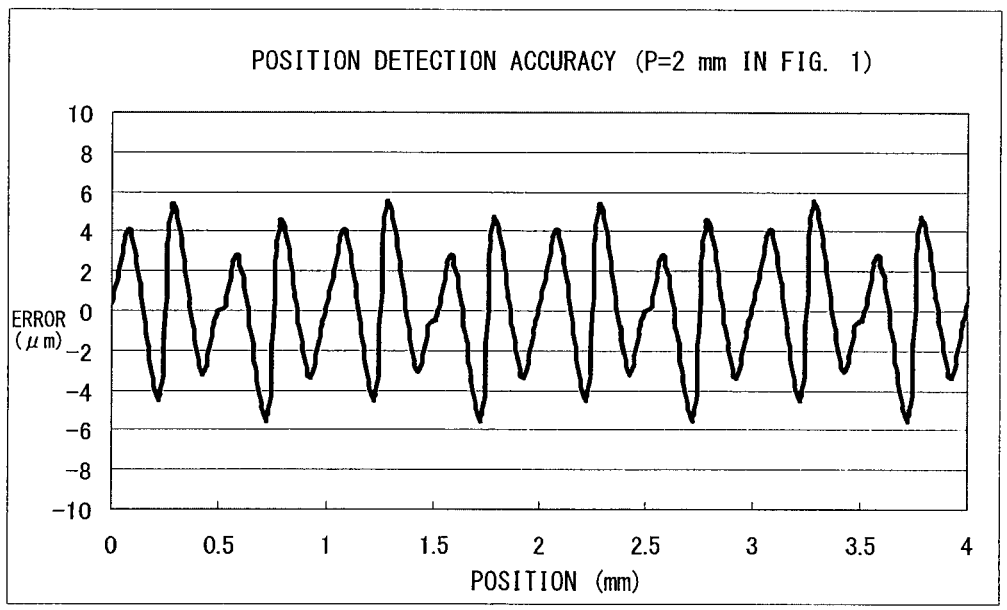
FIG. 4 is a graph showing position detection precision obtained with interpolation processing of signals of the optical encoder of FIG. 1.

As a result, by arranging the light receiving elements having three widths as shown in FIG. 1, then as shown in the graph of FIG. 3, it is possible to obtain signals that are close to a sine wave, varying at a pitch P, and with a third harmonic wave and a fifth harmonic wave varying at pitches P/3 and P/5 cancelled, at signals A+, B+, A− and B−. Also, by carrying out interpolation processing of these four phase signals, then as shown by the graph in FIG. 4, high precision positional detection of less than ±6 μm is possible even with a wide pitch scale having a lattice pitch of 2 mm. As described above, with the present invention, it is possible to realize high precision position detection simply by arranging light receiving elements in narrow regions having just under 3 times the lattice pitch P (178P/60). Also, since the light receiving elements occupy about 90% of the 178P/60 region, namely 160P/60 (7P/60X4+13P/60X4*20P/60×4), it is possible to convert light irradiated to the light receiving elements to electrical signals with high efficiency. A method of the present invention for removing high-frequency components uses the technology disclosed in JP 10-132614 A. However, with the arrangement of the light receiving elements disclosed in JP 10-132614 A, regions having a lattice pitch of at least four times P or more are required. Also, even in FIG. 2 of the same invention having extremely high occupancy rate of light receiving elements, the occupancy rate is limited to about 84%, namely 4P (P/4×16) within a region that is slightly smaller than five times the lattice pitch P (19P/4) Conversely, with the present invention, it is possible to reduce the overall width of an arrangement region by 25% or more from that with the light receiving element arrangement that is disclosed in JP 10-132614 A, as well as making it possible to improve occupancy rate of light receiving elements in the arrangement region to a level close to the limit of about 90%. Also, compared to the technology of JP 10-132614 A, with this embodiment also, since width of light receiving elements for each phase of the scale is very thin, detection for each phase can be carried out at almost the same location. This means that even if tarnishing, small and fine blemishes or errors etc., arise in pitches of scales, there will be even effect on each phase and no unbalance between each output signal, and as a result errors will not arise in position detection. Further, since high order distortion components are removed due to the width of the light receiving elements, it is possible to obtain a displacement signal having only slight distortion from only a few light receiving elements, which has the effect of sufficiently averaging signals, enabling a stable output.

Figure 5:
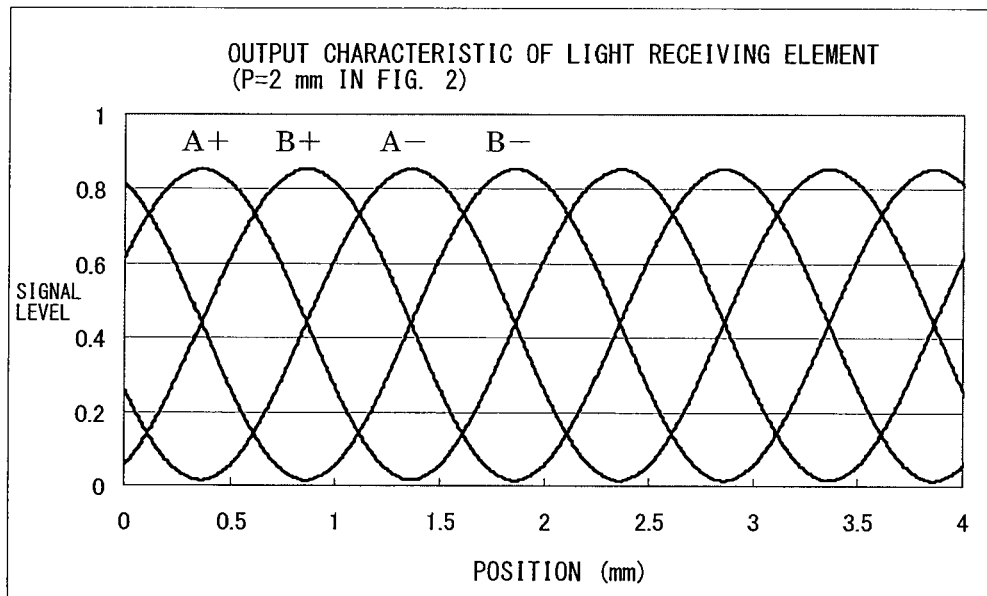
FIG. 5 is a graph showing output signals of the optical encoder of FIG. 2.
Figure 6:
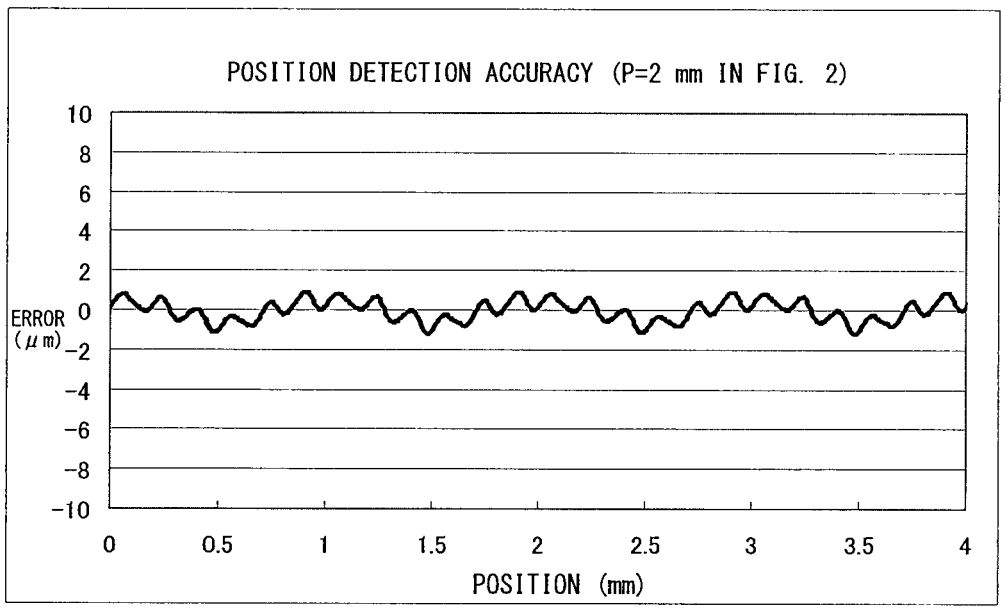
FIG. 6 is a graph showing position detection precision obtained with interpolation processing of signals of the optical encoder of FIG. 2.

FIG. 2 shows another embodiment of the present invention, in which light receiving element 1 and light receiving element 21 in FIG. 1 and FIG. 2, as well as light receiving element 2 and light receiving element 22, light receiving element 3 and light receiving element 23, light receiving element 4 and light receiving element 24, light receiving element 5 and light receiving element 25, light receiving element 6 and light receiving element 26, light receiving element 7 and light receiving element 27, light receiving element 8 and light receiving element 28, light receiving element 9 and light receiving element 29, light receiving element 10 and light receiving element 30, light receiving element 11 and light receiving element 31, and light receiving element 12 and light receiving element 32, are arranged at the same respective positions, and have the same lateral widths. Also, while the light receiving elements 1, 2, 3, 4, 5, 6, 7, 8, 9, 10, 11 and 1 of FIG. 1 are made rectangular, the light receiving elements 21, 22, 23, 24, 25, 26, 27, 28, 29, 30, 32 and 32 of FIG. 2 are made parallelograms with the upper and lower edges offset in the lateral direction by P/7. In this way, by making the shapes of the light receiving elements parallelograms having the two upper and lower edges offset by P/7 in the lateral direction, signals A+, B+, A− and B− become signals which integrated with light amount varying within a pitch of P/7. As a result, a 7th harmonic component that varies at the cycle of the P/7 pitch is canceled. In this way it is possible to obtain signals that are extremely close to a sine wave, as shown in the graph of FIG. 5. Also, by carrying out interpolation processing of these four phase signals, then as shown by the graph in FIG. 6, high precision position detection of less than ±1 μm is possible even with a wide pitch scale having a lattice pitch of 2 mm. There is also an effect of attenuating harmonics higher than the 7th harmonic. In this way, the optical encoder of FIG. 2 has a light receiving region that is increased by P/7 compared to the optical encoder of FIG. 1, and enabling even higher precision position detection.

FIG. 1 and FIG. 2 show examples with light receiving elements having a lateral width of 13P/60 for outputting signal A+ arranged at the left side, but since it is possible to move the light receiving elements at the left side to the right side by 3P, it is possible to arrange an arbitrary light receiving element at the left side. Also, with this embodiment, an example that uses 12 light receiving elements has been shown, but since it is possible to arrange light receiving groups with 12 light receiving elements constituting a single block at intervals of 3P, it is possible to realize the present invention with light receiving elements numbering a multiple of 12, such as 24 light receiving elements or 36 light receiving elements. It is also possible to use respective light receiving elements that output signal A+, signal A−, signal B+ and signal B− in a such manner as to connect photodiodes having different polarity in series and then converting to two phase signals that are different in phase by 90°, such as a difference signal A for signal A+ and signal A−, and a difference signal B for signal B+ and signal B−, at the light receiving element side.

What is claimed is:

1. An optical encoder, comprising:
a plurality of light receiving elements configured to receive light that has passed through or been reflected by a scale having a lattice of pitch P, and said plurality of light receiving elements collectively further configured to output a signal of a first phase, a signal of a second phase, a signal of a third phase, and a signal of a fourth phase, the first, second, third, and fourth phases being offset from each other by an integer multiple of 1/4P, wherein 1/4P is equal to 90°, and wherein
the plurality of light receiving elements all have a same vertical width,
the plurality of light receiving elements comprise 12·N light receiving elements arranged in a lateral direction and spaced apart by P/60 or 2P/60, wherein N is a natural number,
the plurality of light receiving elements are arranged such that any four of said light receiving elements arranged next to each other include a light receiving element outputting the signal of the first phase, a light receiving element outputting the signal of the second phase, a light receiving element outputting the signal of the third phase, and a light receiving element outputting the signal of the fourth phase;
the light receiving elements outputting the signal of the first phase include a light receiving element defining a lateral width of 7P/60, a light receiving element defining a lateral width of 13P/60, and a light receiving element defining a lateral width of 20P/60;
the light receiving elements outputting the signal of the second phase include a light receiving element defining a lateral width of 7P/60, a light receiving element defining a lateral width of 13P/60, and a light receiving element defining a lateral width of 20P/60;
the light receiving elements outputting the signal of the third phase include a light receiving element defining a lateral width of 7P/60, a light receiving element defining a lateral width of 13P/60, and a light receiving element defining a lateral width of 20P/60; and
the light receiving elements outputting the signal of the fourth phase include a light receiving element defining a lateral width of 7P/60, a light receiving element defining a lateral width of 13P/60, and a light receiving element defining a lateral width of 20P/60.

2. The optical encoder of claim 1, wherein each of the plurality of light receiving elements is parallelogram-shaped and has an upper edge and a lower edge offset in the lateral direction by P/7.

* * * * *